United States Patent [19]
Bianchetta

[11] 3,987,626
[45] Oct. 26, 1976

[54] CONTROLS FOR MULTIPLE VARIABLE DISPLACEMENT PUMPS

[75] Inventor: Donald L. Bianchetta, Coal City, Ill.

[73] Assignee: Caterpillar Tractor Co., Peoria, Ill.

[22] Filed: Jan. 23, 1976

[21] Appl. No.: 651,889

[52] U.S. Cl. ............................. 60/445; 60/452; 60/486; 180/6.48
[51] Int. Cl.² .................. F15B 13/09; F16H 39/46
[58] Field of Search ............ 60/420, 422, 427, 428, 60/445, 448, 452, 484, 486; 180/6.48

[56] References Cited
UNITED STATES PATENTS

| | | |
|---|---|---|
| 3,672,161 | 6/1972 | Krusche et al. .................. 60/445 X |
| 3,861,145 | 1/1975 | Hall et al. ............................. 60/427 |
| 3,908,374 | 9/1975 | Habiger ................................ 60/420 |

*Primary Examiner*—Edgar W. Geoghegan
*Attorney, Agent, or Firm*—Frank L. Hart

[57] ABSTRACT

Fluid is selectively, controllably delivered at substantially common rates from separate respective variable displacement pumps in response to a load pressure signal acting on a single pump control valve serving said pumps.

5 Claims, 2 Drawing Figures

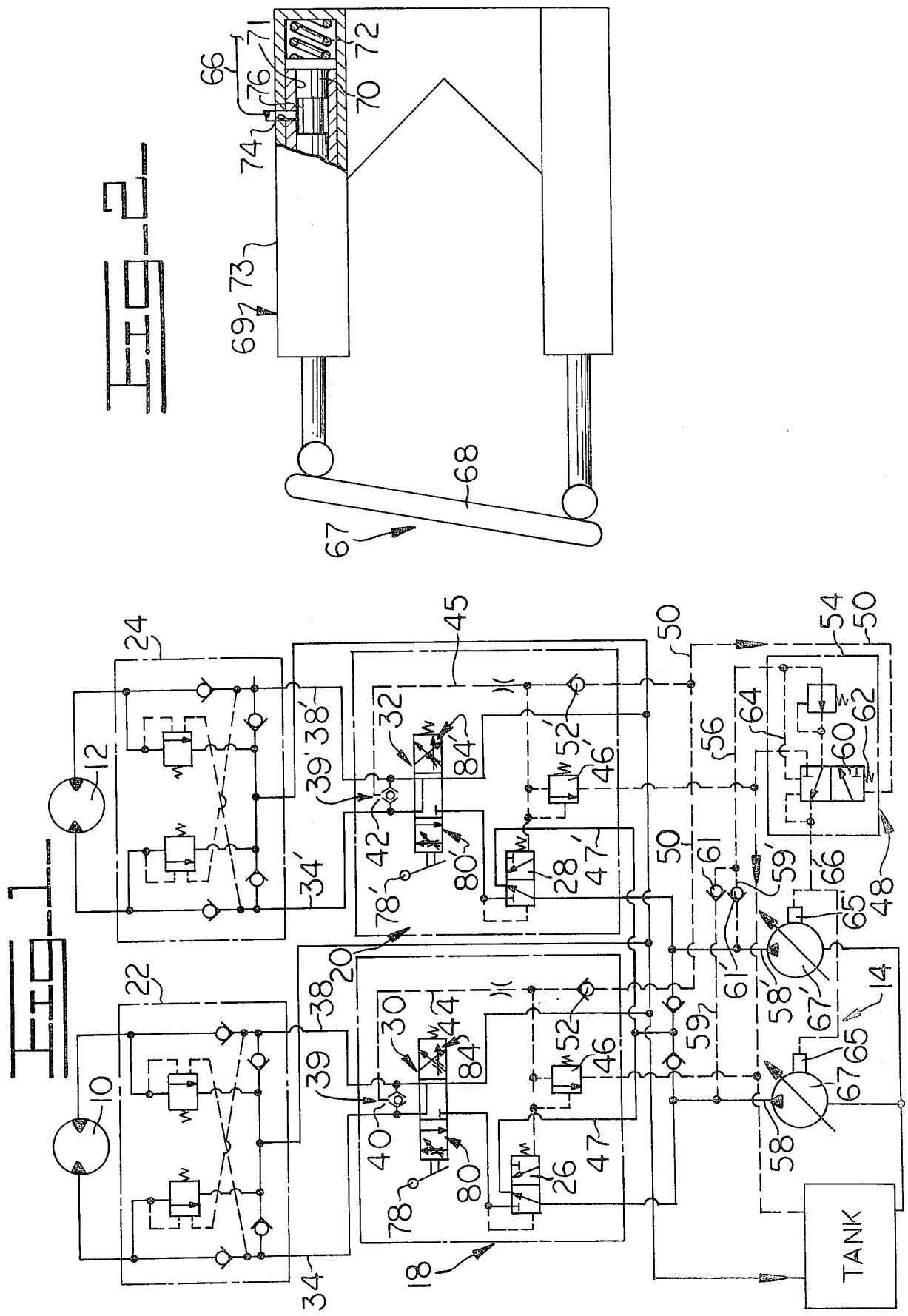

CONTROLS FOR MULTIPLE VARIABLE DISPLACEMENT PUMPS

BACKGROUND OF THE INVENTION

In the operation of fluid actuated work elements, for example left and right tracks of a crawler type tractor, it is desirable to provide means for selectively, controllably delivering hydraulic fluid to the track motors at substantially common rates. If the fluid delivery rate changes, one track will move faster than the other track, which will cause the vehicle to undesirably turn. This is particularly pronounced where the load changes on one of the tracks as, for example, when one of the tracks is scrubbing against an embankment or a large rock. Such control is also more difficult where each track is served by a separate hydraulic fluid pump.

This invention therefore resides in apparatus for selectively, controllably delivering fluid from separate variable displacement pumps in response to a load pressure signal acting on a single pump control valve serving said pumps.

BRIEF DESCRIPTION OF THE DRAWING

FIG. 1 is a diagrammatic view of the apparatus of this invention on an example portion of a hydraulic system of a vehicle having a plurality of separate work elements; and FIG. 2 is a diagrammatic view of the controls of one of the plurality of pumps of the system.

DETAILED DESCRIPTION OF THE INVENTION

Referring to FIG. 1, a vehicle (not shown), for example an excavator, has a plurality of working elements 10, 12 that are operated by a fluid system, preferably a hydraulic system, of the vehicle. The working elements 10,12 are, for example, first and second track motors of a crawler type tractor. The working elements 10,12 are each connected to a pressurized hydraulic fluid source 14 through separate, respective first and second control valve assemblies 18,20 and first and second anticavitation counterbalance valves 22,24.

The first and second control valve assemblies 18,20 have separate, respective first and second three-way pressure compensated flow control valves 26,28 positioned between separate, respective first and second directional control valves 30,32 and the pressurized fluid source 14. The directional control valves 30,32 are each connected to a respective anticavitation counterbalance valve 22,24 which in turn is connected to a respective working element 10,12.

Each of the directional control valves 30,32 has a first conduit 34,34' connected to the respective work element 10,12 via the respective anticavitation counterbalance valve 22,24 for controlled passage of hydraulic fluid from the directional control valves 30,32 to and from their respective working elements 10,12.

Signal means 39,39', such as a resolver valve 40,42 and associated conduit means 44,45, are in fluid communication with the respective first and second conduits 34,38 and 34',38' for sensing the fluid pressures in said conduits and delivering a respective pressure signal that is the larger of said sensed pressures to the respective three-way pressure compensated flow control valve 26,28 for controllably biasing said flow control valves 26,28 toward an open position in response to said respective delivered pressure signals. First and second conduit means 44,45 are provided for passing the pressure signal from respective resolver valves 40,42 to respective three-way flow control valves 26,28.

Signal pressure relief valves 46,46' are each connected in fluid communication with respective first and second conduit means 44,45 for maintaining each respective pressure less than a respective preselected value.

Control means 48 is associated with the pressurized fluid source 14 for selectively controlling fluid discharge from said source 14. A third conduit 50 is connected to the controls 48 in fluid communication with the first and second conduit means 44,45 for passing the pressure signal from the conduit means 44,45 to the control means 48 for the control thereof.

The first and second conduit means 44,45 each have a check valve 52,52' positioned therein with said check valves 52,52' commonly oriented for passing the larger of the pressure signals in said conduit means 44,45 to the control means 48 of the pressurized fluid source 14.

The control means 48 has a pump control valve assembly 54 connected via line 56 to the discharge conduits 58,58' of first and second variable displacement pumps 67,67' via lines 59,59'. Lines 59,59' each have a check valve 61,61' positioned therein. The check valves 61,61' are oriented for passing the larger of the pressure signals from discharge conduits 58,58' into line 56 and to the pump control valve assembly 54. The fluid discharge signal passing through line 56 is controllably altered by spool valve 60 in response to the load pressure signal of the associated working elements 10,12 passing through line 50 and a biasing force of biasing element 62 acting in opposition to the fluid discharge signal passing through line 56 and line 64. The resultant signal passes from the spool valve 60 via line 66 to pump control assemblies 65,65' for controlling the operation thereof.

Referring to FIG. 2, the pumps 67,67' each have a swash plate 68 and a servo motor 69 for biasing the swash plate 68 in a preselectd direction, as is known in the art. As is further known in the art, the servo motor 69 has a spool valve 70 and a sleeve 71 each slidably movable within housing 73, and a spring 72 for exerting a biasing force on the spool valve 70 in a first direction.

Means, such as a port 74 opening into chamber 76, are provided for communicating the pressure signal with an effective area of the spool valve 70 for urging the spool valve 70 in a preselected direction in response to said signal being delivered from the pump 67 through the valve assembly 54.

An example servo valve assembly is more completely described in U.S. Pat. No. 3,861,145 which issued Jan. 21, 1975 to Hall et al. from an application filed Oct. 1, 1973, and which is assigned to Caterpillar Tractor Co. It should be understood, however, that the servo motor 69 can be of other construction and the biasing force imparted by the pressure signal of line 66 can provide a force on the swash plate 68 in either a first direction or an opposed second direction without departing from this invention.

Although the hydraulic system has been described with reference to two differenct working elements and their hydraulic components, it should be understood that this invention is not limited thereto and can be used with a multiplicity of such elements, each having a separate pump controlled by the single pump control valve assembly 54.

In describing the operation of the hydraulic system, reference will generally be made to only the hydraulic portion serving the first working element 10 since the associated elements of the second working element are common with those of the first.

Lever 78 is moved toward or from the directional control valve 30 for shifting said valve 30 to the right or left. At the right shifted position, passageways 80 communicate with conduits 34,38 for passing hydraulic fluid to work element 10 via conduit 34 and from work element 10 via conduit 38. At the left shifted position, passageways 84 communicate with conduits 34,38 for passing hydraulic fluid from work element 10 via conduit 34 and to work element 10 via conduit 38.

When working element 10, for example, is subjected to an increased load, the hydraulic pressure in respective conduits 34 or 38 will increase. By utilizing the apparatus of this invention, the largest pressure of conduits 34,38 passes to flow control valve 26 through conduit means 44. Since pressure signal relief valve 46 is in communication with conduit 44 and is constructed to open at a preselected pressure, said signal pressure relief valve 46 will open, reduce the pressure of conduit 44, cause flow control valve 26 to close with respect to work element 10, pass fluid into line 47, and prevent the pressure from conduits 34 or 38 from further increasing. At this condition, control means 48 of the hydraulic system are provided time sufficient to sense the change in hydraulic fluid demand and accordingly reduce the fluid output while passing fluid from element 26 via line 47 to element 28.

When a greater load is placed on one of the working elements 10 or 12, for example the left track 10 of a crawler type tractor, the pressure in the first conduit means 44 will be greater than the pressure in the second conduit means 45. The pressure of the first conduit means 44 will therefore pass check valve 52 and be delivered via line 50 to one end of the spool valve 60.

This pressure signal acting in conjunction with spring 62 in opposition to the largest discharge pressure signal being delivered through lines 56,64 will cause the discharge pressure signal of 56 to be altered. The resultant altered pressure signal will then pass from the spool 60 via line 66 to the servo motor of each pump 67,67'.

The controls 48 are therefore responsive to the working element load as represented by the signal passing to the control means 48 via line 50 as set forth above. The pump outputs of hydraulic fluid are therefore controlled to be substantially equal in response to the working element load and generally provide pressure and flow no greater than demanded by the system. As set forth above, this is particularly important when the work elements are first and second tracks of a crawler type vehicle and it is desired that the tracks be operated at the same speeds.

Other aspects, objects, and advantages of this invention can be obtained from a study of the drawings, the disclosure, and the appended claims.

What is claimed is:

1. Controls for controllably maintaining substantially common discharge rates from at least first and second variable displacement pumps, comprising:
   - means for sensing the discharge pressure of each pump and delivering a first control signal responsive to the larger of said sensed discharge pressures;
   - means for sensing the load pressure of each work element and delivering a second control signal responsive to the larger of said sensed load pressures;
   - control means for altering the first control signal and delivering a resultant third control signal, said first control signal being altered in response to a preselected biasing force and the second control signal acting in opposition to the first control signal; and
   - means for controlling the displacement of each pump in response to said third control signal.

2. Apparatus, as set forth in claim 1, wherein the discharge pressure sensing signaling means comprises:
   - first and second conduits each being in communication with fluid discharging from respective first and second pumps;
   - first and second discharge check valves positioned in respective first and second conduits and being commonly oriented; and
   - means communicating said first and second conduits at a location downstream of the discharge check valves.

3. Apparatus, as set forth in claim 1, wherein the load pressure sensing signaling means comprises:
   - first and second work elements;
   - a pair of first and second hydraulic fluid conduits each connected to a separate pump and to a respective work element for selective passage of fluid from each pump to its respective work element;
   - first and second resolver valves each in fluid communication with respective said first and second conduits;
   - first and second signal conduits each connected at one end to a respective resolver valve;
   - first and second load pressure check valves each positioned in a respective first and second signal conduit and being commonly oriented; and
   - means for communicating said first and second signal conduits at a location downstream of the load pressure check valves.

4. Apparatus, as set forth in claim 1, wherein the signal altering control means comprises:
   - a spool valve having a first end in communication with the first control signal and the second end in communication with the second control signal and being biased toward the first end by a biasing means.

5. Apparatus, as set forth in claim 1, wherein each pump has a swash plate and the displacement control means of each pump comprises:
   - a servo motor having a spool valve and biasing means for biasing the spool valve in a first direction; and
   - means for communicating the third control signal with the spool valve and urging the spool valve in a preselected direction in response to said third control signal.

\* \* \* \* \*